Dec. 10, 1968  L. J. BISHOP ET AL  3,415,200
TOW TRUCK CONVEYOR SYSTEM

Filed Jan. 4, 1966  7 Sheets-Sheet 3

INVENTORS
LEONARD J. BISHOP, KARL
KARLSTROM & PAUL KLAMP
BY
Barnes, Kisselle, Raisch & Choate
ATTORNEYS

Dec. 10, 1968

L. J. BISHOP ET AL  
TOW TRUCK CONVEYOR SYSTEM 3,415,200

Filed Jan. 4, 1966

INVENTORS
LEONARD J. BISHOP, KARL
KARLSTROM & PAUL KLAMP
BY
Barnes, Kisselle, Raisch & Choate

ATTORNEYS

Fig. 12

INVENTORS
LEONARD J. BISHOP, KARL
KARLSTROM & PAUL KLAMP
BY

ATTORNEYS

United States Patent Office 3,415,200
Patented Dec. 10, 1968

3,415,200
TOW TRUCK CONVEYOR SYSTEM
Leonard J. Bishop, Birmingham, Karl Karlstrom, Roseville, and Paul Klamp, St. Clair Shores, Mich., assignors to Mechanical Handling Systems, Inc., Warren, Mich., a corporation of Michigan
Filed Jan. 4, 1966, Ser. No. 518,696
22 Claims. (Cl. 104—172)

ABSTRACT OF THE DISCLOSURE

The tow truck conveyor system disclosed herein comprises a track defined by a slot in the floor and a plurality of tow trucks having tow pins extending into the slot and engaging a conveyor in the floor. Each tow truck has a front bumper which is movably mounted and operatively connected to the tow pin so that when an obstacle or preceding carrier is engaged, the tow pin is elevated out of engagement with the conveyor. Each tow truck also includes a rear bumper which is movably mounted from a first vertically disposed position wherein it may be operatively engaged by the front bumper of succeeding carrier to a second vertically disposed position where the rear bumper may not be operatively engaged by the front bumper of a succeeding carrier. In one form, the front and rear bumpers are operatively connected. In another form, the rear bumper is moved by cams along the floor. A second bumper at the front of each tow truck is yieldingly mounted for absorbing shock of contact with an obstacle or preceding carrier.

---

This invention relates to tow truck conveyor systems.

In tow truck conveyor systems, a plurality of tow trucks are adapted to be moved along a slot in the floor by engagement of a tow pin on each tow truck with a conveyor beneath the floor. It has heretofore been suggested that the trucks be constructed so that they will accumulate when an obstacle is encountered. Conventionally, such a structure comprises a front bumper movably mounted on the front of each tow truck and adapted to be moved rearwardly and thereby lift the tow pin. As the front bumper of a leading truck encounters an obstacle, the front bumper moves rearwardly to lift the tow pin. It has also been conventional to cause the movement of the front bumper to move a rear bumper into position for engagement with the front bumper of a succeeding truck. As each succeeding truck approaches the first or leading truck, the front bumper thereof engages the rear of the leading truck to lift the tow pin of the succeeding truck.

One of the problems with such a system is that it is desirable that the trucks also be adapted to accumulate against another truck or to push it depending upon whether the leading truck is stopped through the action of its accumulation bumper or whether it is standing free as in the case when the truck has been pushed into a nonpowered spur line. In the latter case, the truck is powered into the spur line until its tow pin is free of the conveyor. After this, it comes to a stop. In this position, it is in the way of the main line traffic and it is the function of a truck approaching from behind to push it into the spur line until it is clear of the main line traffic. If the trucks were purely accumulating trucks, this could not be done. One truck after another approaching this area would stop, thus producing an intolerable situation.

It is, therefore, among the objects of the invention to provide a tow truck conveyor system wherein the tow trucks can be accumulated as well as pushed through a spur line; wherein the tow trucks have a novel front and rear bumper construction; wherein the pushing action of the tow trucks is cushioned; wherein the tow trucks are simple in construction, rugged and relatively low in cost.

Figure 1:
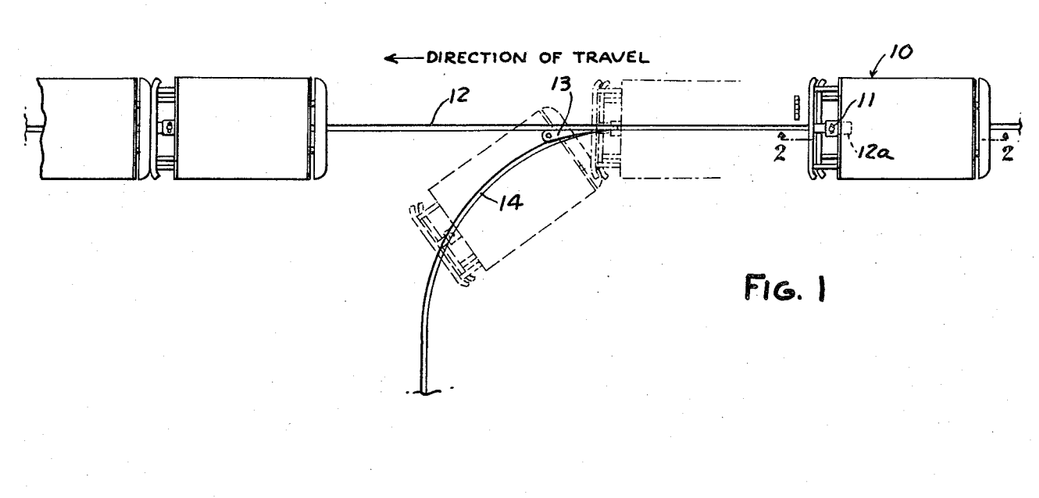
FIG. 1 is a diagrammatic plan view of a tow truck conveyor system embodying the invention.

Referring to FIG. 1, the tow truck conveyor system comprises a plurality of wheeled tow trucks 10, each of which has a tow pin 11 that extends downwardly into a slot 12 and is engaged by a lug 12a on a conveyor chain 12b beneath the floor to pull the tow truck along the slot. At points along the slot 12, switch tongues 13 can be provided for guiding the tow pin into spur tracks or slots 14. The spur tracks or slots may not be powered, that is, there are no conveyors along the spur slots so that it is necessary to push the truck through the spur line clear of the succeeding trucks which are passing along the main slot 12.

Figure 2:
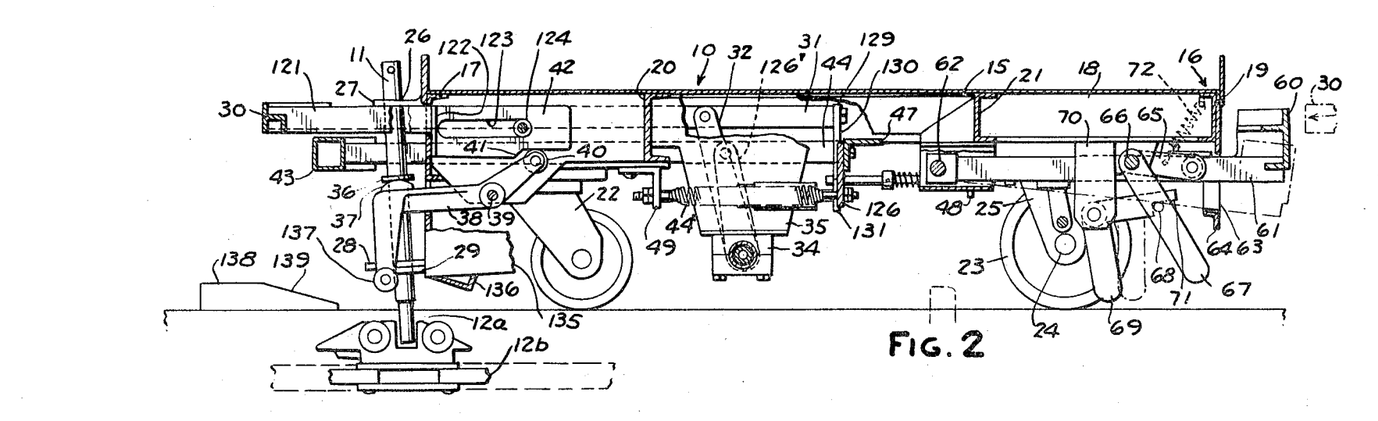
FIG. 2 is a fragmentary sectional view on an enlarged scale taken along the line 2—2 in FIG. 1.
Figure 3:
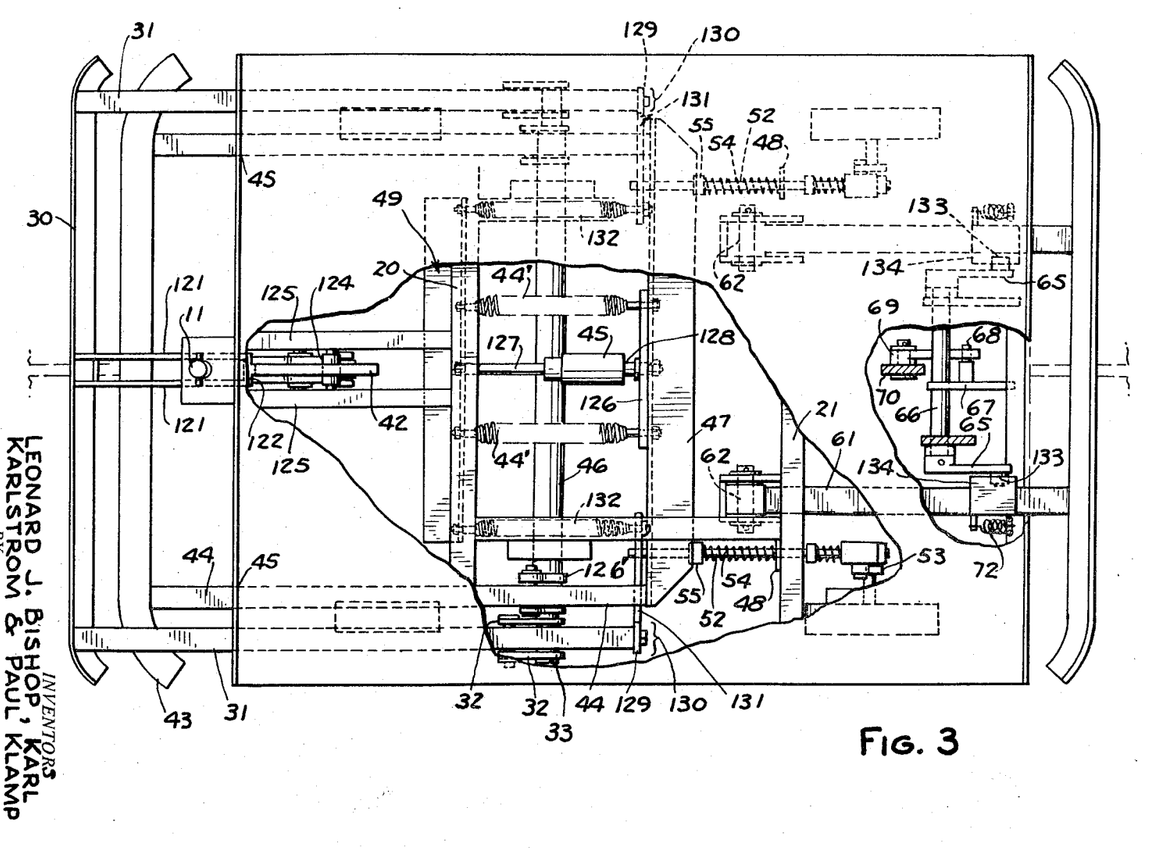
FIG. 3 is a part sectional plan view of the tow truck shown in FIG. 2.

Referring to FIGS. 2 and 3, the tow truck 10 comprises a body which includes a flat horizontal plate 15 that is welded on a frame 16 comprising a front member 17, side members 18 and a rear member 19. Transverse channel members 20, 21 extend between the side members 18. Caster wheels 22 are provided at the front of the truck 10 and conventional wheels 23 are mounted on an axle 24 which is mounted on brackets 25 at the rear of the truck.

The tow pin 11 is mounted for vertical sliding movement at the front end of the truck in an opening 26 on a bracket 27. The lower end of the tow pin 11 extends downwardly through an elongated opening in a bracket 28 and a circular opening in a line 29 that is slidably mounted for longitudinal movement on the lower end of the bracket. The link 29 is connected to a pair of tension springs (not shown) and a shock absorber to provide a limited yielding movement of the lower part of the tow pin when the lug 13 on the conveyor chain engages the tow pin to thereby minimize shock. Such a construction is disclosed and claimed in the patent to Klamp, 3,015,284.

A first or upper front bumper 30 is mounted on the front of the truck on a pair of tubular members 31 which are guided in and extend through openings in the front member 17. The rear ends of the tubular members 31 are supported by links 32 that are pivoted at their upper ends to the rear of the tubular members 31 and are fastened at their lower ends to a tube 33 that is pivoted inside a tube 46 which is, in turn, supported for pivotal movement in journals 34 on the lower end of brackets 35 extending downwardly from the tow truck.

In order to lift the tow pin 11 as the bumper 30 engages a preceding truck or obstacle, the tow pin is formed with a collar 36 that engages cams 37 on a forked lever 38. The lever 38 is pivoted at 39 to the carrier and has a roller 40 between the upper ends thereof which is adapted to be engaged by a cam 41 on a cam plate 42 fastened to the bumper 30 by means of two parallel flat bars 121 which are welded at one end to the bumper and at the other end to a flange portion 122 of cam plate 42. The space between the two bars 121 provides the required room to let the tow pin pass through. As shown in FIGS. 2 and 3, the cam plate 42 is provided with an elongated slot 123 for guiding against vertical deflection, with a roller 124 mounted between two truck frame members 125 and passing through the slot 123. When the bumper 30 moves rearwardly, the cam 41 also moves rearwardly engaging the roller 40 to swing the lever 38 in a clockwise fashion as viewed in FIG. 2 to lift the tow pin 11 by means of cams 37 and collar 36.

A second or lower bumper 43 in the form of a tube is mounted on the front of the truck on tubular members 44 which extend through openings 45 in the front member 17. The rear ends of the tubes 44 are supported by links 126' pivoted at their upper ends to the tubes 44 and fixed at their lower ends to the tube 46 that is telescoped over the tube 33.

As shown in FIGS. 2 and 3, a connecting angle member 47 extends between the ends of the tubular members 44 of the lower bumper 43. A plate 126 is welded to angle 47 and extends downwardly. An angle member 49 is fastened to the underside of the truck frame, forwardly of plate 126. Two tension springs 44' are interposed between plate 126 and angle member 49 to yieldingly urge the plate 126 and the lower bumper 43 forwardly. Also interposed between plate 126 and angle member 49 is a shock absorber 45 which resists rearward motion of plate 126. The end studs 127 and 128 of the shock absorber are shouldered against the faces of plate 126 and angle member 49 which are provided with holes through which reduced diameter portions of the studs 127 and 128 pass and are fastened by nuts. In the position shown in FIG. 3 the springs 44 have moved the plate 126 and the lower bumper 43 to their extreme forward positions where the shock absorber 45 is fully collapsed and serves as a stop for the forward motion. When fully extended, the shock absorber 45 serves as a stop for the rearward motion of the lower bumper 43.

Fastened to the rear end of each of the two tubes 31 which carry the upper bumper 30 is an angle shaped plate 129 with a vertical leg 130 and a horizontal leg 131, with the top edge of leg 131 being below the bottom of angle 47 to permit passing underneath this angle when the upper bumper 30 is moved rearwardly. Interposed between the two horizontal legs 131 and the fixed angle member 49 are two tension springs 132 for yieldingly urging the upper bumper forwardly until this motion is stopped when the lower part of flange 122 of cam plate 42 comes to bear against the inner face of truck frame member 17.

When the upper bumper 30 is moved rearwardly to elevate the tow pin 11, provision is made for applying brakes to the rear wheels which includes rods 52 that extend through openings in the horizontal legs 131 of the angle shaped plates 129 and through openings in plates 48 which are fastened to the truck cross member 21. Each rod 52 is connected to a brake lever 53 which operates a conventional cam type brake in its respective wheel. Springs 54 are telescoped over the rods 52 between the corresponding plate 48 and a collar 55 to yieldingly urge the rods 52 forwardly out of brake operating position. When the front bumper 30 is moved rearwardly, the horizontal legs 131 of the angle shaped plates 129 engage the collars 55 at the moment when the tow pin 11 is just rising clear of the pusher dog 12a, thus compressing the springs and moving the rods 52 rearwardly to apply the brakes. When the bumper 30 is released and it moves forward again, the springs 54 moves the rods 52 forward again to the position shown in FIG. 2 and thus release the brakes.

Figure 4:
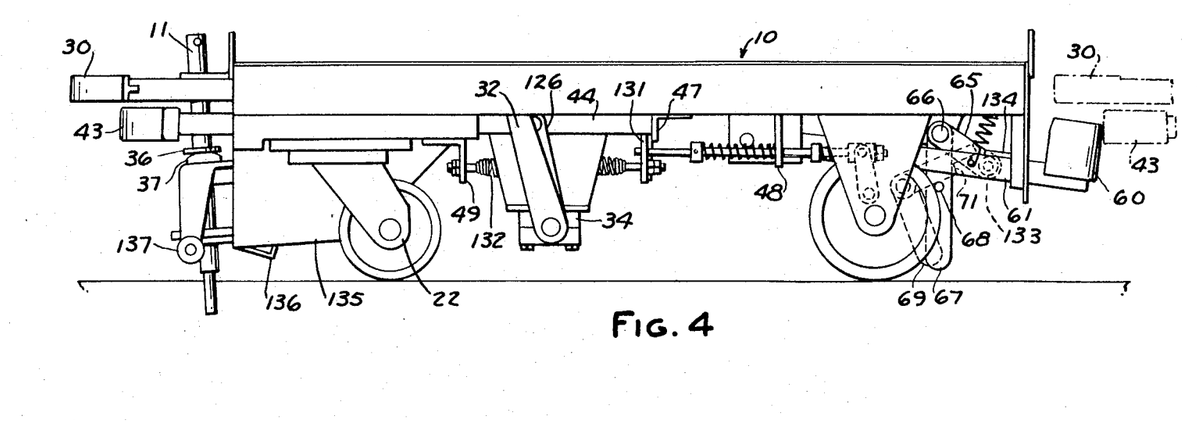
FIG. 4 is a side elevational view of the tow truck shown in FIG. 2, showing the parts in a different operative position.

Referring to FIG. 2, a rear bumper 60 is pivoted by arms 61 to shafts 62 on the truck. The arms 61 extend through openings 63 in a support bracket 64 so that the bumper 60 is movable in a manner show in FIG. 2 from the full line position to the dotted line position. In the full line position, the bumper 60 is adapted to be engaged by the upper bumper 30 of a succeeding truck to cause the succeeding truck to accumulate. However, when the bumper 60 is in its lower position, the bumper 30 clears the bumper 60 and, since the lower bumper 43 extends forwardly a lesser distance than the upper bumper 30 as shown in FIG. 4, the bumper 60 will be engaged only by the lower bumper 43 of a succeeding truck so that the succeeding truck will not accumulate. On the contrary, the succeeding truck will then push the preceding truck, the bumper 43 operating as a pushing and shock absorbing bumper. This will then push the preceding truck through a spur line.

Provision is made for locking the rear bumper 60 in its upper position and includes levers 65 that are pivoted to the underside of the carrier at one end and each carry a roller 133 at the other end. Each arm 61 has a plate 134 welded thereon which rests on top of the respective roller 133 so that a counterclockwise movement of levers 65 will raise arms 61 and rear bumper 60. The levers 65 are fixed to a shaft 66 that is provided with a downwardly extending latch arm 67 on which a latch pin 68 extends laterally. A latch lever 69 is pivoted to a bracket 70 on the underside of the carrier and is provided with a notch 71 that is adapted to engage the latch pin 68 to hold the arm 67 and, in turn, the levers 65, arms 61 and bumper 60 in the upper or counterclockwise position as viewed in FIG. 2. The latch lever 69 and latch arm 67 are adapted to be actuated by cams along the track or slot. When a cam engages the latch arm 67, it swings the latch lever in a counterclockwise direction as viewed in FIGS. 2 and 4 to permit the latch lever 69 to pivot clockwise under the action of gravity and cause the notch 71 on latch lever 69 to engage the pin 68 on latch arm 67. A cam at a different point along the track will engage the latch lever 69 to swing it counterclockwise permitting the weight of the rear bumper 60 to move the rear bumper downwardly to its lower position (FIG. 4). The weight of the bumper 60 is partially counterbalanced by springs 72.

Figure 5:
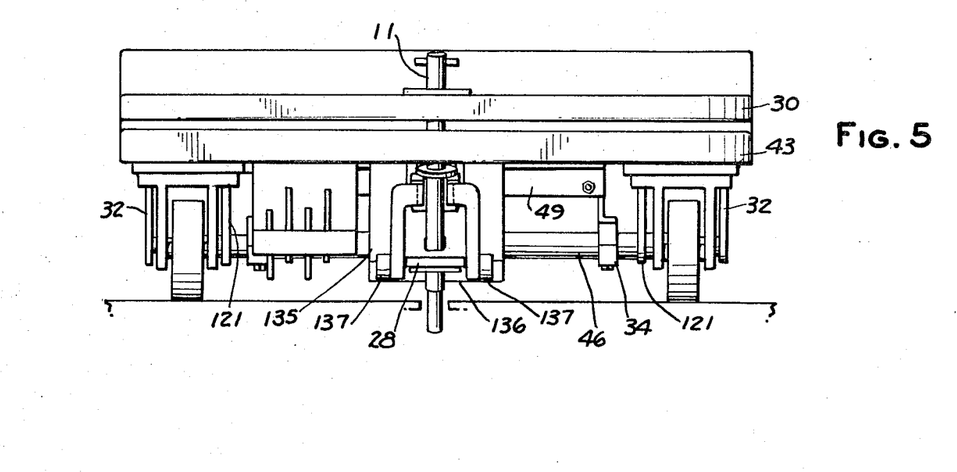
FIG. 5 is a front elevational view of the tow truck shown in FIGS. 2–4.

The lower tow pin bracket 28 is attached to a housing 135 shown in FIGS. 2, 4 and 5 which is welded to the truck frame. Also attached to the housing 135 is an angle 136 which serves as a stop for a moving truck when the angle 136 comes in contact with the sloped parts 139 of a pair of stops 138 (FIG. 2) which are spaced on either side of the floor slot. Rollers 137 are mounted on either side of the forked lever 33. The rollers 137 of an approaching truck will ride up on the sloped fronts 139 of stops 138 and turn the lever 33 clockwise to lift the tow pin 11 clear of the pusher dog 12a. Immediately thereafter the truck comes to a stop when the angle 136 bears against the stops 138. The stop 138 is shiftable sideways in and out of operating position by mechanisms such as air cylinders mounted just below floor level. It is shifted further away from the floor slot to release a truck which had been stopped and is shifted to the operating position when an approaching truck is to be stopped for loading or unloading.

Figure 6:
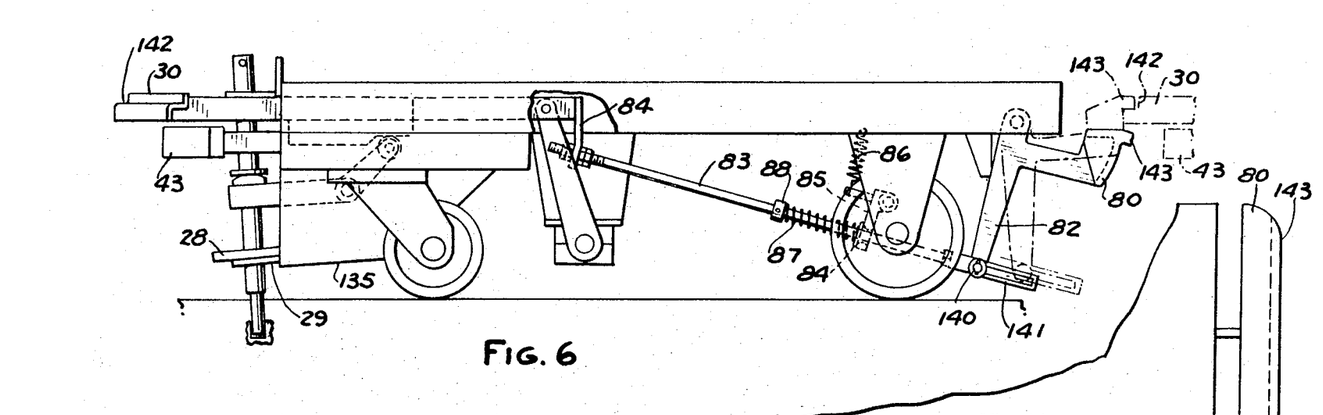
FIG. 6 is a side elevational view of a modified form of tow truck.
Figure 7:
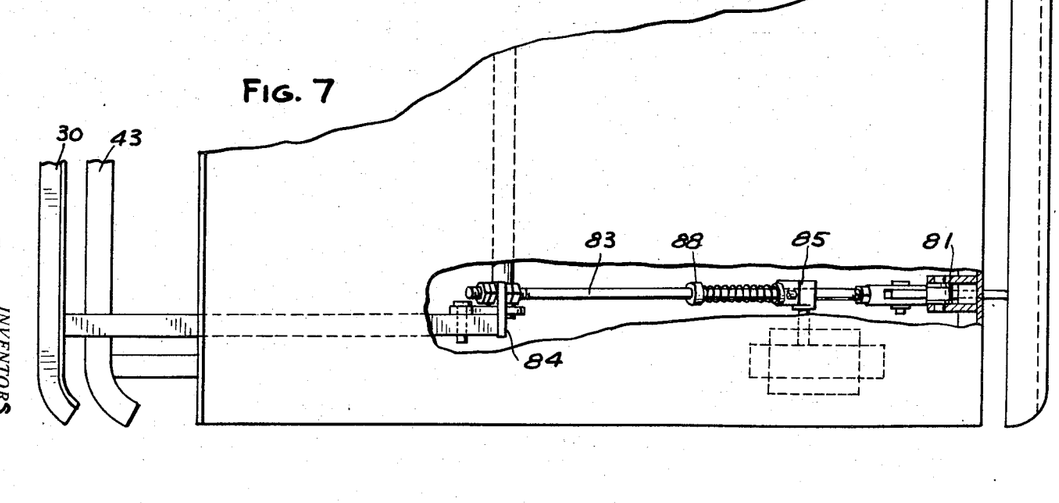
FIG. 7 is a fragmentary plan view of the tow truck shown in FIG. 6, parts being broken away.

In the form of the invention shown in FIGS. 6 and 7, the front bumpers and tow pins are supported and moved in the same manner as in the form of the invention shown in FIGS. 1–3. However, the rear bumper and brake operating mechanism are constructed and operated in a different manner. Specifically, the rear bumper 80 is pivoted to brackets 81 on the rear of the truck so that it swings upwardly to a position for actuating bumper 30 of a succeeding truck and downwardly to a second position for contacting the shock absorbing bumper 43 of a succeeding truck. An arm 82 extends downwardly from the pivot of the bumper 80 and is connected by a link 83 and bracket 84 to the rear of the front bumper 30 so that when the front bumper 30 is moved rearwardly upon encounter with an obstacle or a preceding truck, the rear bumper 80 is moved upwardly into position for contacting the bumper 30 of the succeeding truck. If, however, the truck is stopped, for example, in a spur without encountering a preceding truck, the bumper 80 is in its lower position so that the bumper 30 of a succeeding truck clears the bumper 80 and the shock absorbing bumper 43 of the succeeding truck engages the bumper 80 of the preceding truck to push the truck through the spur line clear of the main line.

When the link 83 is moved rearwardly, it operates the brakes on the rear wheels. Specifically, a collar 84 on the link 83 connects the operating lever 85 of each brake to the rods so that when the rod 83 is moved rearwardly, the operating levers 85 are also moved rearwardly to operate the brake. A spring 86 yieldingly urges the levers 85 out of braking position. A second spring 87 is interposed between the operating lever 85 and a collar 88. Spring 87 is stronger than spring 86 and overpowers it after rod 83 has completed part of its rearward motion at which time the tow pin is lifted clear of the pusher dog of the propelling chain.

For reasons hereinafter described, the hinged connection between the arm 82 and the link 83 consists of a hinge pin 140 anchored in arm 82 and extending sideways therefrom through a slot 141 in the link 83. The upper front bumper is provided with a shelf 142 extending from end to end, while the rear bumper has a projection 143 also extending from end to end. In order to avoid difficulties in negotiating horizontal turns and track switches, the trucks have to be separated during travel, so that in a group of accumulated trucks, only the leading one should be released for further travel by means of retracting a stop and lowering the tow pin. Therefore the tow pin of the leading truck only should be lowered, and the tow pin of the second truck should not be lowered until the first truck has been moved away by the chain dog 12a. The rollers 137 for lifting the tow pin shown in FIGS. 4 and 5 are omitted in the truck in FIG. 6, as is the stopping angle 136. The truck is stopped in a known manner by two floor stops which are raised by an electric motor drive or air cylinders from floor level to contact the front surfaces of the front bumpers 30 and 43 successively. At first the upper bumper 30 is held back to raise the tow pin and apply the brakes in the manner described. Thereafter the lower bumper 43 contacts the stop so that from this moment both front bumpers move backwards a small distance while the lower bumper motion is resisted by the shock absorber. The rear bumper is now in the dash-dot line position where it successively holds back the upper and lower bumper of an approaching second truck, thus causing its tow pin to be lifted, its brakes to be applied, and its rear bumper to be raised.

If now the floor stop is released from the first truck, its front bumpers move forward again under the action of their return springs. This causes the tow pin to be dropped, the brakes to be released, and the link 83 to move forward, but the rear bumper does not drop, because its projection 143 rests on the shelf 142 of the second truck. Therefore arm 82 cannot move forward, but the slot 141 in link 83 allowed the latter to move forward with the upper bumper of the first truck. Only when an approaching chain dog 12a moves the first truck ahead, is its rear bumper moved clear of the shelf 142 of the upper front bumper of the second truck, so that now the rear bumper of the first truck can drop to its normal position. From this time the second truck operates in relation to a third truck as described above for the first and second trucks. In this manner, in a group of accumulated trucks, the tow pin of the leading truck only is lowered when such truck is released for further travel.

In the form of the invention shown in FIGS. 8–12, the front bumper 90 is relatively narrow in width and includes a pair of rearwardly extending support arms 91 which are fastened to a shaft 92 which is pivoted in two downwardly extending brackets 93. When the bumper 90 encounters an obstacle or a preceding truck, as presently described, the bumper 90 is swung upwardly causing two cams 94 thereon to engage a collar 95 on the tow pin 96, lifting the tow pin out of engagement with the dog of the conveyor chain.

Figure 8:
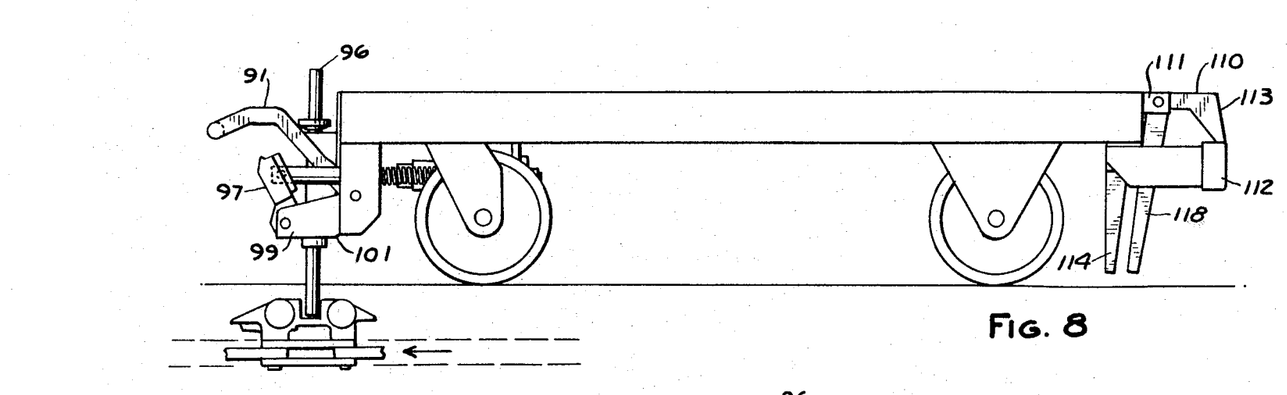
FIG. 8 is a side elevational view of a further modified form of tow truck.

A lower shock absorbing bumper 97 is supported through its attachments 98 on brackets 99 for swinging movement. The rearward movement of the bumper 97 is opposed by springs 100 that are interposed between an angle member 101 and a bar 102 that is, in turn, connected to the bumper by shafts 103. A dashpot type shock absorber 104 dampens the movement of the shock absorbing bumper 97.

Figure 9:
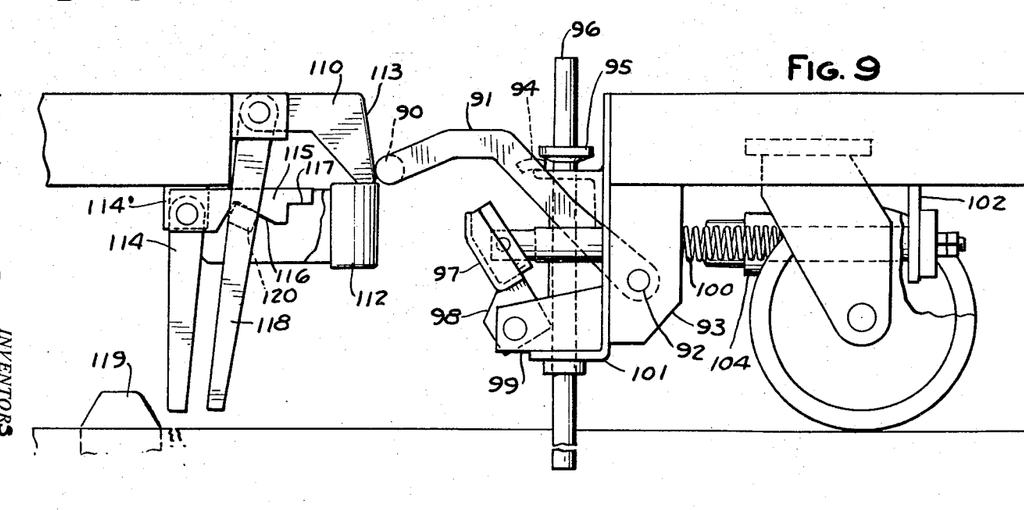
FIGS. 9, 10 and 11 are fragmentary side elevational views of a pair of trucks such as shown in FIG. 8 showing the relative positions of the parts in different operative positions.
Figures 10, 11:
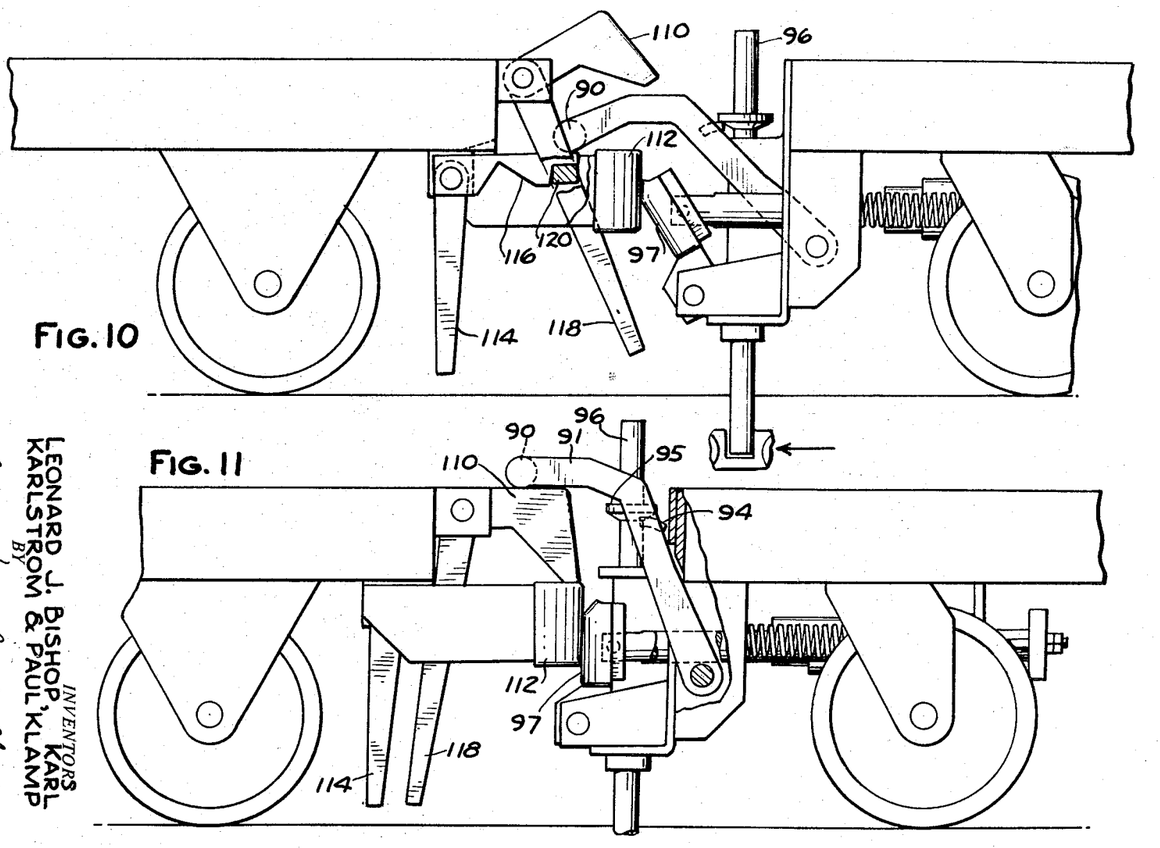
Figure 12:
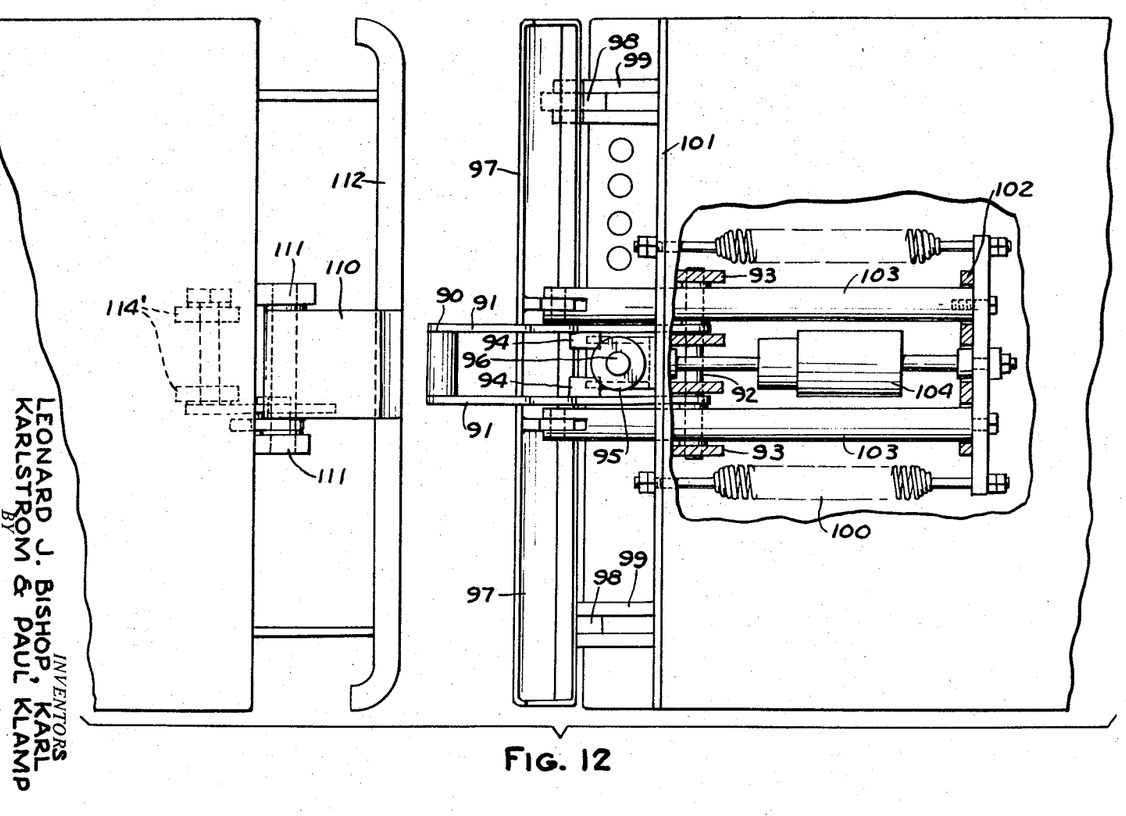
FIG. 12 is a fragmentary plan view of the truck shown in FIG. 9.

Referring to FIGS. 8 and 12, the truck includes an upper movable rear bumper 110 that is pivoted to brackets 111 and a rear fixed bumper 112 which extends across the entire width of the truck at the rear of the truck. As shown in FIG. 9, when the rear bumper 110 is in its lower position, the front bumper 90 of a succeeding truck will encounter the rear bumper 110. As shown, the rear bumper 110 includes an upwardly and forwardly inclined surface 113 which will cam the front bumper 90 of a succeeding truck upwardly and cause it to pass over the top of the rear bumper 110 as shown in FIG. 11 to raise the tow pin out of contact with the dog of the conveyor chain. Further movement of the succeeding truck forwardly will bring the shock absorbing bumper 97 into contact with the fixed rear bumper 112 of the preceding truck to swing the shock absorbing bumper rearwardly and thereby absorb the shock of the engagement of the succeeding truck with the preceding truck.

If, however, it is desired to move a truck through a spur line so that succeeding trucks will not accumulate but will push the truck through the spur line, the rear bumper 110 is swung upwardly as shown in FIG. 10 and locked therein, as presently described. Thus, when the truck is switched to a spur line and a succeeding truck approaches the switched truck, the front bumper 90 of the succeeding truck will not contact the rear bumper 110 but will remain in its lowered position so that the tow pin will not be raised. As a result, further movement of the succeeding truck will cause the bumper 97 to engage the fixed bumper 112 of the truck on the spur line and push the truck further into the spur line clear of the main line. As shown in FIGS. 9 and 10, the mechanism for locking the rear bumper 110 in its upper position includes a latching lever 114 that is pivoted to the underside of the truck on two brackets 114' (FIG. 12) and has a rearwardly extending arm 115 with notches 116, 117 therein. The rear bumper 110 has a downwardly extending operating lever 118. When it is desired to move a truck into a spur line, a cam 119 along the floor engages the operating lever 118 swinging it counterclockwise as the truck moves along the floor to cause a lug 120 thereon to move into engagement with the notch 117 holding the rear bumper in its upper position as shown in FIG. 10. After the truck has been pushed to a spur line, a second cam (not shown) may be engaged by the latching lever 114 to swing the latching lever counterclockwise swinging the arm 115 to move the notch 117 out of engagement with the lug 120 and thereby permit the rear bumper 110 to swing downwardly under its own weight into its original position.

We claim:
1. The combination comprising
   an article carrier,
   a track along which said carrier is adapted to be moved,
   conveyor means along said track,
   means on the carrier movable to and from a position of operative engagement with said conveyor means,
   a front bumper movably mounted on the front end of said carrier,
   means operatively connecting said first bumper and said conveyor engaging means, a rear bumper mounted on the rear of said carrier and movably mounted from a first vertically disposed position wherein it may be operatively engaged by the front bumper of a succeeding carrier to a second vertically disposed position wherein the rear bumper may not be operatively engaged by the front bumper of a succeeding carrier, said carrier having a portion adapted to engage a preceding carrier when the rear bumper is in said second position, such that when said rear bumper is in said first position, it will be engaged by the front bumper of a succeeding carrier and said succeeding carrier will be disengaged from the conveyor means and when said front bumper is in said second position, said carrier can be pushed by a succeeding carrier.

2. The combination set forth in claim 1 wherein said portion of said carrier comprises a second front bumper yieldingly mounted on said carrier and adapted to be engaged by the rear of a preceding carrier when the rear bumper of a preceding carrier is in said second position.

3. The combination set forth in claim 1 including means along said track for moving said rear bumper to and from said first and second positions.

4. The combination set forth in claim 1 wherein said front and rear bumpers are operatively connected such that when said front bumper engages an obstacle in the path of the carrier, said rear bumper is moved to said first-mentioned position.

5. The combination set forth in claim 4 including interengaging means on one of said carriers operable when the rear bumper of a leading carrier is in said first position and is in operative engagement with the front bumper of a succeeding carrier to prevent the front bumper of said succeeding carrier from moving to a position where it will permit engagement of the conveyor engaging means on the succeeding carrier with the conveyor means.

6. The combination set forth in claim 1 wherein said rear bumper is pivoted to said carrier,
 spring means yieldingly urging said rear bumper toward said first-mentioned position,
 and a latch for locking said rear bumper in said first-mentioned position.

7. The combination set forth in claim 6 including a first lever adapted to be operated by a cam along said track for disengaging said latch.

8. The combination set forth in claim 7 including a second lever pivoted to said carrier and adapted to be operated by a cam along said track for lifting the rear bumper to engage the latch.

9. The combination set forth in claim 7 wherein said rear bumper is pivoted to said carrier,
 a third lever pivoted to said carrier and operatively connected to said rear bumper,
 the second lever being adapted to be latched to said first lever for holding said rear bumper in said first-mentioned position.

10. The combination set forth in claim 9 including a first cam along said track adapted to engage said second lever and move said lever into latching position with said first lever and a second cam along said track adapted to engage said first lever for moving it out of latching position with said second lever.

11. The combination comprising
 an article carrier,
 a track along which said carrier is adapted to be moved,
 conveyor means along said track,
 means on the carrier movable to and from a position of operative engagement with said conveyor means,
 a first bumper movably mounted on the front end of said carrier,
 means operatively connecting said first bumper and said conveyor engaging means,
 a second bumper mounted on the front end of said carrier in vertically spaced relationship to said first bumper,
 a third bumper mounted on the rear of said carrier and movably mounted from a first vertically disposed position wherein it is operatively engaged by the first bumper of a successive carrier to a second vertically disposed position wherein it is not operatively engaged by said first bumper such that when said third bumper is in said first position, a succeeding carrier will be disengaged from the conveyor means and when said third bumper is in said second position, the rear of said carrier will be engaged by the second bumper of a succeeding carrier and will be pushed.

12. The combination set forth in claim 11 wherein said second bumper is yieldingly mounted on said carrier and is adapted to engage the third bumper of a preceding carrier when the third bumper is in its second position.

13. The combination set forth in claim 11 including means along said track for moving said third bumper to and from said first and second positions.

14. The combination set forth in claim 13 wherein said third bumper is pivoted to said carrier,
 spring means at least partially counterbalancing said third bumper,
 and a latch for locking said third bumper in said first-mentioned position.

15. The combination set forth in claim 14 including a lever adapted to be operated by said means along said track and operable to disengage said latch.

16. The combination set forth in claim 14 including a second lever pivoted to said truck and adapted to be operated by said means along said track for lifting the rear bumper to engage said latch.

17. The combination set forth in claim 11 wherein said first and third bumpers are operatively connected such that when said first bumper engages an obstacle in the path of the carrier, said third bumper is moved to said first-mentioned position.

18. The combination set forth in claim 17 including interengaging means on one of said trucks operable when the rear third bumper of a leading carrier is moved into operative engagement with the front first bumper of a succeeding carrier to prevent the front bumper of said succeeding carrier from moving to a position where it will cause engagement of the conveyor engaging means on the succeeding truck with the conveyor means.

19. The combination set forth in claim 11 wherein said article carrier comprises a tow truck,
 said track comprises a main slot,
 said conveyor engaging means comprises a tow pin moving to and from a position of operative engagement with said conveyor means.

20. The combination set forth in claim 19 including means for mounting said first and second bumpers on said truck comprising
 a transverse member rotatably mounted on said truck,
 links fixed to said last mentioned member pivoted to said first-mentioned bumper at the other end for guiding the rear end of said first-mentioned bumper,
 a second transverse member telescoped over said first mentioned transverse member and rotatable relative thereto,
 links fixed to said second transverse member at one end and to the rear end of said second bumper for supporting the rear end of said second bumper.

21. The combination comprising
 an article carrier adapted to be moved along a track,
 means on the carrier movable to and from a position of operative engagement with conveyor means along the track,
 a first bumper mounted and supported on said carrier intermediate its ends for movement longitudinally of the carrier,
 a first transverse member rotatably mounted on said carrier intermediate its ends,
 links fixed to said first transverse member pivoted to said first bumper at the other end for guiding the rear end of said first bumper, means operatively connecting said first bumper and said conveyor engaging means whereby when said first bumper is moved rearwardly of said carrier, said conveyor engaging means is moved out of operative engagement with said conveyor means, a second bumper, means on the carrier for supporting said second bumper intermediate its ends for longitudinal movement relative to said carrier, a second transverse member telescoped over said first transverse member and rotatable relative thereto, links fixed on said second transverse member at one end and pivoted to said second bumper for supporting the rear end of said second bumper.

22. The combination comprising a tow truck adapted to be moved along a track, a tow pin on the truck movable to and from a position of operative engagement with conveyor means along the track, a first bumper mounted and supported on said truck intermediate its ends for movement longitudinally of the truck, a first transverse tube rotatably mounted on said truck, links fixed to said first tube at one end and pivoted to said first bumper at the other end for guiding the rear end of said first bumper, means operatively connecting said first bumper and said tow pin whereby when said first bumper is moved rearwardly of said carrier, said tow pin is moved out of operative engagement with conveyor means, a second bumper, means on the carrier for supporting said second bumper intermediate its ends for longitudinal movement relative to said carrier, a second tube telescoped over said first tube and rotatable relative thereto, links fixed to said first tube and pivoted to said second bumper for supporting the rear end of said second bumper, a rear bumper pivoted to said carrier, said rear bumper being movable from a first position wherein it is adapted to be engaged by the first bumper of a succeeding carrier to a second position where it is out of engagement with the first bumper of a succeeding carrier.

References Cited

UNITED STATES PATENTS

| | | | |
|---|---|---|---|
| 3,044,416 | 7/1962 | Reibel | 104—178 |
| 3,048,126 | 8/1962 | Salapatas | 104—178 |
| 3,094,944 | 6/1963 | Bradt | 104—172 |
| 3,103,895 | 9/1963 | Bradt | 104—172 |

ARTHUR L. LA POINT, *Primary Examiner.*

D. F. WORTH, *Assistant Examiner.*

U.S. Cl. X.R.

104–178.